US010373059B2

(12) United States Patent
Lindman et al.

(10) Patent No.: US 10,373,059 B2
(45) Date of Patent: Aug. 6, 2019

(54) THEMATIC MAG BASED ACTIVITY TYPE PREDICTION

(71) Applicant: Suunto Oy, Vantaa (FI)

(72) Inventors: Erik Lindman, Vantaa (FI); Michael Miettinen, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 66 days.

(21) Appl. No.: 15/365,970

(22) Filed: Dec. 1, 2016

(65) Prior Publication Data

US 2017/0154270 A1 Jun. 1, 2017

(30) Foreign Application Priority Data

Dec. 1, 2015 (FI) .................................... 20155905
Dec. 1, 2015 (GB) ................................... 1521193.1

(51) Int. Cl.
G06N 5/04 (2006.01)
G06F 16/29 (2019.01)
(52) U.S. Cl.
CPC ............... G06N 5/04 (2013.01); G06F 16/29 (2019.01)
(58) Field of Classification Search
CPC .......... G06N 5/04; G06N 20/00; G06F 17/30
See application file for complete search history.

(56) References Cited

U.S. PATENT DOCUMENTS

2009/0171939 A1* 7/2009 Athsani ............. G06F 17/30241
2012/0116550 A1* 5/2012 Hoffman ............. A63B 24/0084
700/91

2014/0278064 A1* 9/2014 Lee ........................ G01C 21/34
701/428
2015/0058345 A1 2/2015 Mishra et al.
2015/0160026 A1* 6/2015 Kitchel .................... G01C 5/06
701/533
2015/0235266 A1 8/2015 Jain et al.
2016/0007912 A1* 1/2016 Hu ........................ A61B 5/002
600/595

FOREIGN PATENT DOCUMENTS

WO WO 2013184744 A2 12/2013

OTHER PUBLICATIONS

Chen, Liming, et al. "Sensor-based activity recognition." IEEE Transactions on Systems, Man, and Cybernetics, Part C (Applications and Reviews) 42.6 (2012): 790-808.*

* cited by examiner

Primary Examiner — Eric Nilsson
(74) Attorney, Agent, or Firm — Seppo Laine Oy

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to determine a predicted user activity type based at least partly on a thematic map database and a current location of the apparatus, present the predicted user activity type as a suggested activity type to a first user, and responsive to the first user approving the suggested activity type, initiate an activity session of the suggested activity type.

22 Claims, 6 Drawing Sheets

THEMATIC MAG BASED ACTIVITY TYPE PREDICTION

FIELD

The present application relates to the field of device usability and safety.

BACKGROUND

A user interface, UI, enables a user to interact with a device, such as, for example, a car, a smartphone, an automated banking device or an aircraft control system. Different user interfaces are appropriate for different purposes, for example, where the user uses the device to perform actions that set persons at risk, the quality and quantity of information presented to the user when interacting with the user interface must be sufficient to enable use of the device safely, while not overloading the user with unnecessary information.

User interfaces may be based on presenting information to the user, and receiving inputs from the user. Information may be presented using an output device such as a display, for example an organic light-emitting diode, OLED, display. Inputs may be received from the user via various input devices, such as touchscreen displays, push buttons, microphones arranged to capture the user's speech and/or levers the user can pull.

A traditional user interface of a wristwatch comprises a long and a short arm, which rotate over a watch dial to indicate the time of day. Digital wrist watches may comprise, for example, a liquid crystal display, LCD, type display indicating the time of day numerically.

A smart watch may comprise a touchscreen, such that the display portion of the touchscreen acts as an output device of the user interface and the touch sensitive portion of the touchscreen acts as an input device of the user interface. Using a smart watch presents challenges, since useful applications tend to require larger screens to present a useful quantity of information using a font large enough, that users can read it without magnifying devices.

A small form factor user interface can benefit from being able to assist the user in making selections, for example, by presenting a smaller number of options at a time for the user to choose from. While a smart watch is an example of a small form factor device, other examples include small cell phones, miniature tablet devices and smart jewelry.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to determine a predicted user activity type based at least partly on a thematic map database and a current location of the apparatus, present the predicted user activity type as a suggested activity type to a first user, and responsive to the first user approving the suggested activity type, initiate an activity session of the suggested activity type.

Various embodiments of the first aspect may comprise at least one feature from the following bulleted list:

- the thematic map database comprises a heat map
- the thematic map database associates past indications of activity type with geographic locations where the past indications of activity type have been made
- the past indications of activity type have been made by a plurality of users
- the at least one memory and the computer program code are configured to, with the at least one processing core, cause the apparatus to determine the predicted user activity type based at least partly on at least one of the following: a season of the year, a time of day, an output of an acceleration sensor, user settings of the first user and history information of the first user
- the acceleration sensor is comprised in the apparatus
- the apparatus is configured to receive the output of the acceleration sensor from a personal device of the user
- the apparatus is configured to receive the output of the acceleration sensor via a short-range wireless interface arranged between the apparatus and the personal device of the user
- the at least one memory and the computer program code are configured to, with the at least one processing core, cause the apparatus to determine the predicted user activity type at least partly by transmitting a query to a thematic map database server, the query comprising an indication of the current location of the apparatus
- the at least one memory and the computer program code are configured to, with the at least one processing core, cause the apparatus to modify a display provided to the first user based at least partly on the predicted user activity type prior to the first user approving the suggested activity type
- the at least one memory and the computer program code are configured to, with the at least one processing core, cause the apparatus to determine the predicted user activity type based at least partly on presence of sensor information originating in an activity type specific sensor.

According to a second aspect of the present invention, there is provided a method comprising determining a predicted user activity type based at least partly on a thematic map database and a current location of an apparatus, presenting, by the apparatus, the predicted user activity type as a suggested activity type to a first user, and responsive to the first user approving the suggested activity type, initiating an activity session of the suggested activity type.

Various embodiments of the second aspect may comprise at least one feature corresponding to a feature from the preceding bulleted list laid out in connection with the first aspect.

According to a third aspect of the present invention, there is provided an apparatus comprising means for determining a predicted user activity type based at least partly on a thematic map database and a current location of the apparatus, means for presenting the predicted user activity type as a suggested activity type to a first user, and means for initiating an activity session of the suggested activity type responsive to the first user approving the suggested activity type.

According to a fourth aspect of the present invention, there is provided a non-transitory computer readable medium having stored thereon a set of computer readable instructions that, when executed by at least one processor, cause an apparatus to at least determine a predicted user activity type based at least partly on a thematic map database and a current location of the apparatus, present the predicted user activity type as a suggested activity type to a first user, and responsive to the first user approving the suggested activity type, initiate an activity session of the suggested activity type.

According to a fifth aspect of the present invention, there is provided a method comprising receiving an indication of a location of a device, determining a predicted user activity type based at least partly on a thematic map database and the location of a device, and transmitting to the device an indication of the determined predicted user activity type. The method of the fifth aspect may be performed in a server computer, for example. More than one user predicted activity type may be determined, and where more than one predicted user activity type is determined, an indication concerning at least two predicted user activity types may be transmitted to the device.

According to a sixth aspect of the present invention, there is provided a computer program configured to cause a method in accordance with at least one of the second and fifth aspects to be performed.

EMBODIMENTS

Figure 1A:
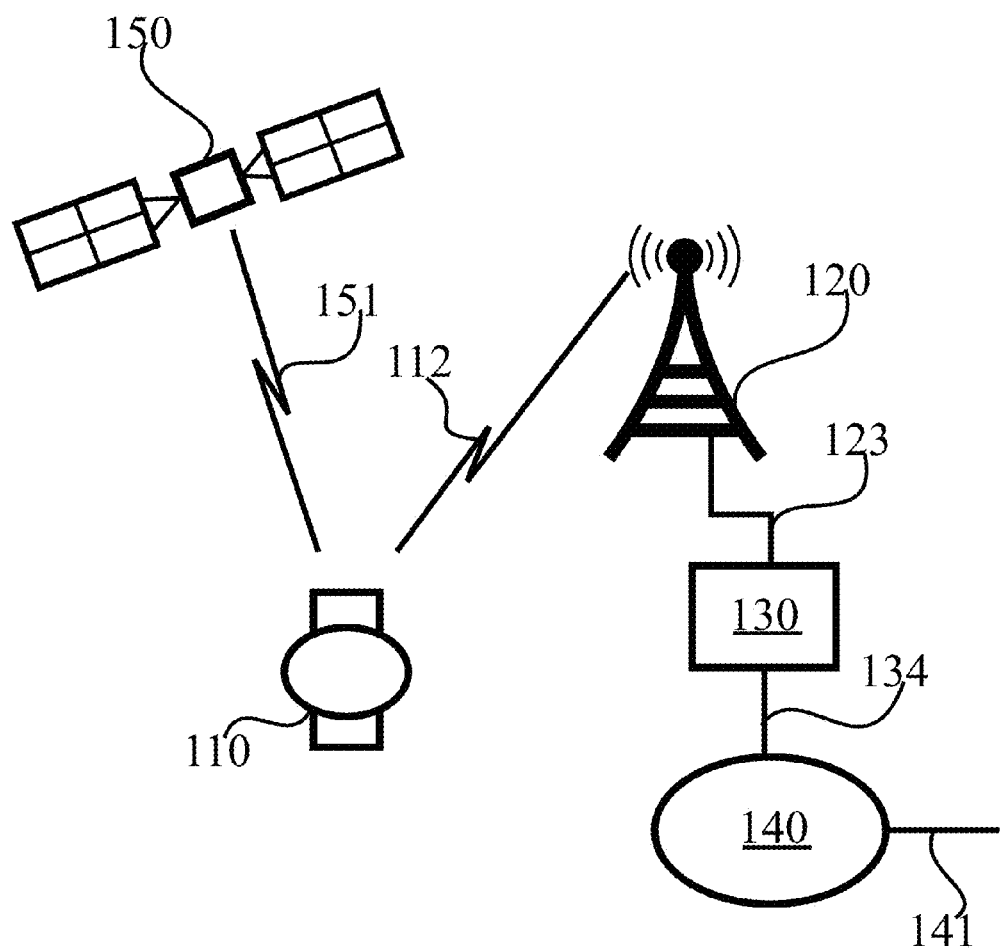
FIG. 1A illustrates a system in accordance with at least some embodiments of the present invention.

A thematic map database, for example a heat map, may be compiled to cover a geographic area. Users may indicate activity types they engage in while in the geographic area. Activity types may include jogging, swimming and cycling, for example. Over time, the thematic map database may become useful in predicting a user's activity type. For example, in case a user is in a location where, previously, most users have been jogging, the jogging activity type may be associated in the thematic map database with the location, and the user may be predicted to also be jogging. Jogging may be presented to the user as a suggested activity type, enabling the user to select it by simply accepting the suggestion, rather than selecting jogging from a list of activity types.

FIG. 1 illustrates a system in accordance with at least some embodiments of the present invention. The system comprises device 110, which may comprise, for example, a smart watch, digital watch, smartphone, phablet device, tablet device, or another type of suitable device. Device 110 comprises a display, which may comprise a touchscreen display, for example. The display may be limited in size. Device 110 may be powered, for example, by a rechargeable battery. An example of a limited-size display is a display worn on a wrist.

Device 110 may be communicatively coupled with a communications network. For example, in FIG. 1 device 110 is coupled, via wireless link 112, with base station 120. Base station 120 may comprise a cellular or non-cellular base station, wherein a non-cellular base station may be referred to as an access point. Examples of cellular technologies include wideband code division multiple access, WCDMA, and long term evolution, LTE, while examples of non-cellular technologies include wireless local area network, WLAN, and worldwide interoperability for microwave access, WiMAX. Base station 120 may be coupled with network node 130 via connection 123. Connection 123 may be a wire-line connection, for example. Network node 130 may comprise, for example, a controller or gateway device. Network node 130 may interface, via connection 134, with network 140, which may comprise, for example, the Internet or a corporate network. Network 140 may be coupled with further networks via connection 141. In some embodiments, device 110 is not configured to couple with base station 120.

Device 110 may be configured to receive, from satellite constellation 150, satellite positioning information via satellite link 151. The satellite constellation may comprise, for example the global positioning system, GPS, or the Galileo constellation. Satellite constellation 150 may comprise more than one satellite, although only one satellite is illustrated in FIG. 1 for the same of clarity. Likewise, receiving the positioning information over satellite link 151 may comprise receiving data from more than one satellite.

Alternatively or additionally to receiving data from a satellite constellation, device 110 may obtain positioning information by interacting with a network in which base station 120 is comprised. For example, cellular networks may employ various ways to position a device, such as trilateration, multilateration or positioning based on an identity of a base station with which attachment is possible. Likewise a non-cellular base station, or access point, may know its own location and provide it to device 110, enabling device 110 to position itself within communication range of this access point.

Device 110 may be configured to obtain a current time from satellite constellation 150, base station 120 or by requesting it from a user, for example. Once device 110 has the current time and an estimate of its location, device 110 may consult a look-up table, for example, to determine a time of day. Device 110 may likewise gain knowledge of the time of year.

Device 110 may be configured to provide an activity session. An activity session may be associated with an activity type, which may be referred to as a user activity type. Examples of activity types include rowing, paddling, cycling, jogging, walking, boxing, hunting and yoga. In some embodiments, activity types comprise professional activity types, such as, for example, maintenance work in a nuclear power station or guiding aircraft on a tarmac.

An activity session in device 110 may enhance a utility a user can obtain from the activity, for example, where the activity involves movement outdoors, the activity session may provide a recording of the activity session. An activity session in device 110 may, in some embodiments, provide the user with contextual information during the activity session. Such contextual information may comprise, for example, a display of a local map with an indication of the location of the user on the map. Such contextual information may comprise at least one of the following: a weather forecast, a weather warning, an indication of time remaining before sunset, an indication of a nearby service that is relevant to the activity, a security warning, an indication of nearby users and an indication of a nearby location where several other users have taken photographs. Where the contextual information comprises a security warning, the contents of the warning may depend on the user's role. For example, visitors at a nuclear power station may be advised to leave the area, while workers may be instructed to take steps to contain damage caused by an event. In this case, the activity session visitors are engaged in may be of a visit activity type, while the activity session workers are engaged in may be of a maintenance work activity type.

A recording may comprise information on at least one of the following: a route taken during the activity session, a metabolic rate or metabolic effect of the activity session, a time the activity session lasted, a quantity of energy consumed during the activity session, a sound recording obtained during the activity session and an elevation map along the route taken during the activity session. A route may be determined based on positioning information. Metabolic effect and consumed energy may be determined, at least partly, based on information concerning the user that device 110 has access to. A recording may be stored in device 110, an auxiliary device, or in a server or data cloud storage service. A recording stored in a server or cloud may be encrypted prior to transmission to the server or cloud, to protect privacy of the user.

An activity session may have access to a backhaul communications link to provide indications as to the ongoing activity. For example, search and rescue services may be given access to information on joggers in a certain area of a forest, to enable their rescue if a chemical leak, for example, makes the forest unsafe for humans. Alternatively or additionally, further users may be enabled to receive information on ongoing activity sessions. Such further users may be pre-configured as users who are cleared to receive such information, with non-cleared users not being provided such information, for example. As a specific example, users on a friend list may be able to obtain information on an ongoing activity session. The friend list may be maintained in a social media service, for example. The information on the ongoing activity session may be provided from device 110 as periodic updates, for example.

The user may initiate an activity session by interacting with a user interface of device 110, for example. Where device 110 has s small form factor, the user interface may be implemented over a limited user interaction capability, such as, for example, a small screen, small touchscreen, and/or limited number of push buttons. A limited user interaction capability may make it arduous for the user to perform complicated interactions with device 110, which makes it less likely the user will choose to interact with device 110. Therefore, it is of interest to simplify the interaction between device 110 and the user, to make it easier for the user to complete the interaction, and thus more likely the user will perform the interaction.

One way to simplify the interaction is to predict the activity type the user is going to engage in. Users may engage in activity sessions, and information on such sessions may be collected in a server apparatus. The collected information may be used to compile a thematic map database of activity sessions, such that the thematic map database associates densities of user activity type uses with geographic locations. Such a database may be referred to as a heat map, for example. The database thus may indicate, as a function of location, statistical probabilities of a set of user activity types, based on the activity types of the past activity sessions at that location. As an example, the database may be queried with a location, and the database may responsively indicate that 55% of past activity sessions in that location have been jogging sessions, 35% have been cycling sessions, 5% have been walking sessions and 5% have been other or unrecognized-type sessions. In some embodiments, the database returns the set of user activity types in probability order without explicitly indicating the probabilities themselves. In some embodiments, the database returns only the most likely activity type, based on the information contained in the database.

Once device 110 is in possession of the set of user activity types relevant to the present location, it may select one from among the set as a predicted user activity type and present it as a suggested activity type to the user. For example, the activity type with the highest statistical probability may be taken as the predicted activity type. As another example, device 110 may be configured to refer to past activity sessions of the particular user when making the selection. For example, in the example described above of jogging 55%, cycling 35% and walking 10%, device 110 may select cycling as the predicted user activity type in case the user has never performed a jogging session but has engaged in several cycling sessions. In general, the predicted user activity type may be determined as the activity type in the set returned from the database that has the highest probability from among those activity types in the set the user has engaged in the past. In even more general terms, the predicted user activity type may be determined from among the set of activity types obtained from the database, based at least partly on past sessions of the user. Information on past sessions comprises history information. Device 110 may have access to indications of past activity sessions to enable determining which user activity types the user has engaged in the past.

The determined predicted user activity type may be presented to the user as a suggested or preselected activity type, which the user can select via a simple interaction with the user interface, such as by activating an "accept" or similar feature of the user interface, for example. In some embodiments, a second-most likely activity type is presented as a secondary predicted user activity type, for example in smaller font, which the user may select instead of the preselected activity type using a simple interaction. The user may also be presented with a possibility to select another activity type, in case the predicted activity type or types are not what the user is about to do, or already doing. The another activity type may be then selectable from a longer list of activity types, for example.

Device 110 may provide to the thematic map database an indication of the user's choice, regardless of whether the user selects a predicted or non-predicted activity type, to enhance the thematic map database further. Such indications may be anonymized prior to sending to the database, both to protect the user's privacy and to comply with local legislation.

In some embodiments, the user may have indicated in settings that he prefers certain activity types and/or has no interest in other activity types, wherein such indications may be taken into account when determining the predicted activity type. They may be taken into account, for example, by eliminating from the set of activity types returned from the database those activity types indicated as uninteresting, and/or favouring from among the set those activity types the user has indicated as preferable.

A time of year and/or a time of day may be employed in either the thematic map database or in the determining of the predicted user activity type. For example, the thematic map database may comprise data collected at different times of year, for example a same location may be associated with frequent jogging in summertime and frequent skiing during the winter months. Thus, the database may return jogging as an activity type in the set of activity types associated with the location in case the query is made in the summer, and the database may return skiing as an activity type in the set of activity types associated with the location in case the query is made in the winter. Alternatively or in addition, device 110 may select activity types consistent with the time of year, or time of day, from the set of activity types returned from the database when determining the predicted user activity type. Device 110 may perform this task in embodiments where the database doesn't collect statistics separately according to time of year or day, for example.

In some embodiments, device 110 is configured to use sensor information from an acceleration sensor in determining the predicted user activity type. For example, once device 110 is in possession of the set of activity types associated with the current location, device 110 may check whether the sensor information is consistent with the foremost choice among the set. The foremost choice may comprise the activity type device 110 would select from the set in case the sensor information was not used. In case the sensor information rather indicates the user is performing another activity type in the set than the foremost activity type, device 110 may determine that activity type as the predicted user activity type and thus at least partly override the statistical probabilities associated with the activity types comprised in the set from the database. For example, in case the set indicates the most likely activity type is walking and the second-most likely activity type is jogging, and the sensor information from the acceleration sensor indicates the user seems to already be jogging, jogging may be determined as the predicted user activity type.

Alternatively or additionally to an acceleration sensor, a heart rate sensor may be employed, wherein an elevated heart rate may be used as an indication the user is already engaged in an intensive activity type, such as jogging, rather than walking. Further, a wind sensor, for example, may be used in conjunction with a positioning capability of device 110 to locate the user more accurately, for example to an indoors or outdoors location. For example, the same coordinates may refer to a place inside a sports hall, or another site on the roof of the sports hall. Different activity types may be relevant to the hall and the roof, wherein such information may be used in determining the suggested or predicted activity type from the set received from the thematic map database.

In some embodiments the user may have an activity type specific sensor, such as, for example, a wheel speed sensor usable in a bicycle. In such a case, presence of nonzero sensor data from such a sensor may affect the determination of the predicted user activity type such that the predicted user activity type may be set to the activity type the sensor is specific to. Thus, for example, there a bicycle wheel speed sensor indicates the user is cycling, cycling may be determined as the predicted user activity type. A further example of an activity type specific sensor is a gunshot sensor configured to detect gunshots from an air pressure pulse generated in firing a weapon. A yet further example is a cadence sensor configured to measure a pedaling rate.

In some embodiments, device 110 is configured to optimize what is displayed on a display associated with device 110 based on an activity type the user is predicted to be performing. Such optimizing may be based on the predicting and may occur without user intervention, for example. Such predicting may be based on the thematic map database and/or acceleration sensor information, for example. Where the display is limited in size, optimizing the content displayed on it may be particularly useful. For example, when jogging a heart rate may be displayed instead of the date. As another example, when walking the time of day may be prominently displayed, to increase the situational awareness of the user.

In general, the thematic map database may be comprised in a server or cloud device, or it may be downloaded, at least in part, to device 110 or an auxiliary device, for offline use. An auxiliary device is described below in connection with FIG. 1B.

Figure 1B:
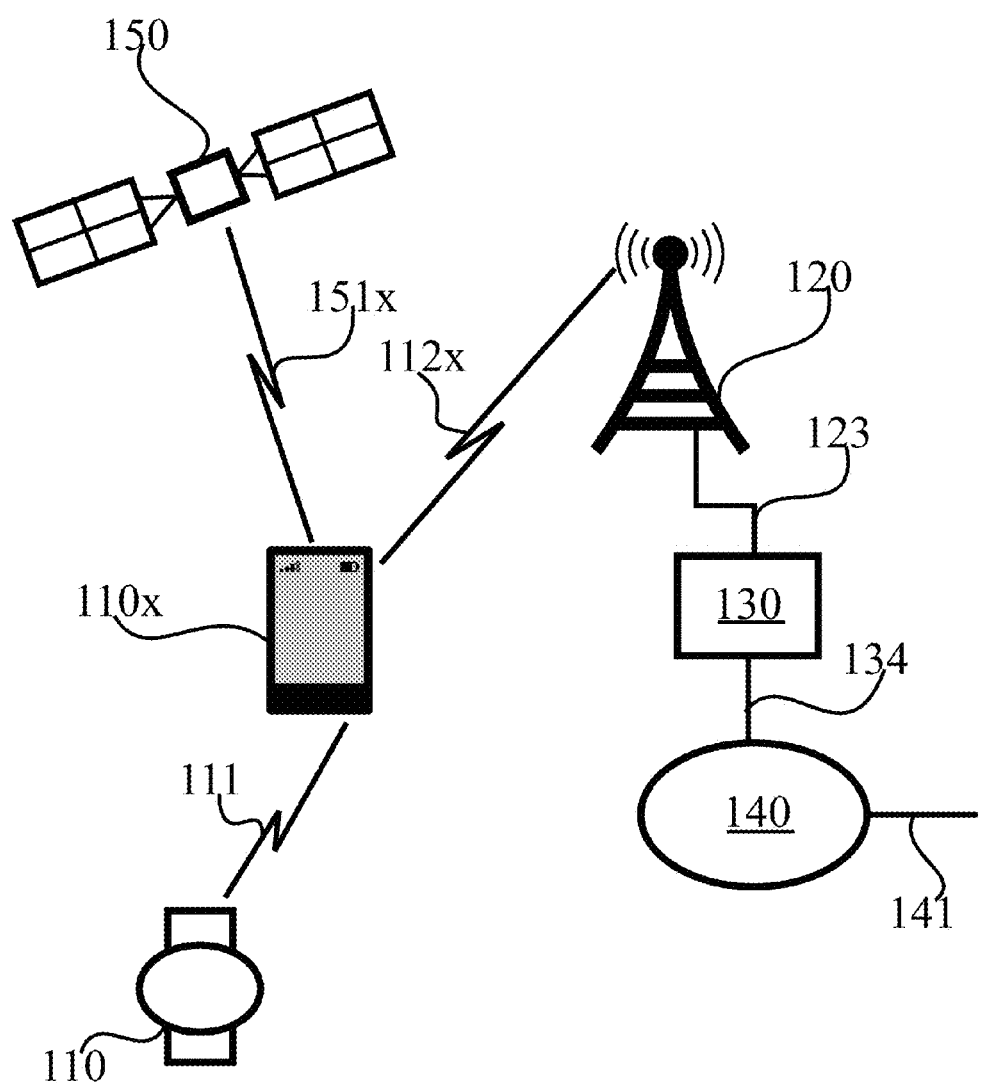
FIG. 1B illustrates a system in accordance with at least some embodiments of the present invention.

FIG. 1B illustrates a system in accordance with at least some embodiments of the present invention. Like numbering denotes like structure as in FIG. 1A. FIG. 1B embodiments comprise an auxiliary device 110x.

Device 110 may be communicatively coupled, for example communicatively paired, with an auxiliary device 110x. The communicative coupling, or pairing, is illustrated in FIG. 1 as interface 111, which may be wireless, as illustrated, or wire-line, depending on the embodiment. Auxiliary device 110x may comprise a smartphone, tablet computer or other computing device, for example. Auxiliary device 110x may comprise a device that the owner of device 110 uses to consume media, communicate or interact with applications. Auxiliary device 110x may be furnished with a larger display screen than device 110, which may make auxiliary device 110x preferable to the user when a complex interaction with an application is needed, as a larger screen enables a more detailed rendering of interaction options. In some embodiments, such as those illustrated in FIG. 1A, auxiliary device 110x is absent.

In some embodiments, where auxiliary device 100x is present, device 110 is configured to use connectivity capability of auxiliary device 110x. For example, device 110 may access a network via auxiliary device 110x. In these embodiments, device 110 need not be furnished with connectivity toward base station 120, for example, since device 110 may access network resources via interface 111 and a connection auxiliary device 110x has with base station 120. Such a connection is illustrated in FIG. 1B as connection 112x. For example, device 110 may comprise a smart watch and auxiliary device 110x may comprise a smartphone, which may have connectivity to cellular and/or non-cellular data networks. Likewise, in some embodiments device 110 may receive satellite positioning information, or positioning information derived therefrom, via auxiliary device 110x where device 110 lacks a satellite positioning receiver of its own. A satellite connection of auxiliary device 151x is illustrated in FIG. 1B as connection 151X.

In some embodiments, device 110 may have some connectivity and be configured to use both that and connectivity provided by auxiliary device 110x. For example, device 110 may comprise a satellite receiver enabling device 110 to obtain satellite positioning information directly from satellite constellation 150. Device 110 may then obtain network connectivity to base station 120 via auxiliary device 110x. For example, device 110 may transmit a query to the thematic map database via auxiliary device 110x. In some embodiments, device 110 is configured to request, and responsively to receive, sensor information from auxiliary device 110x. Such sensor information may comprise acceleration sensor information, for example.

Figure 2:
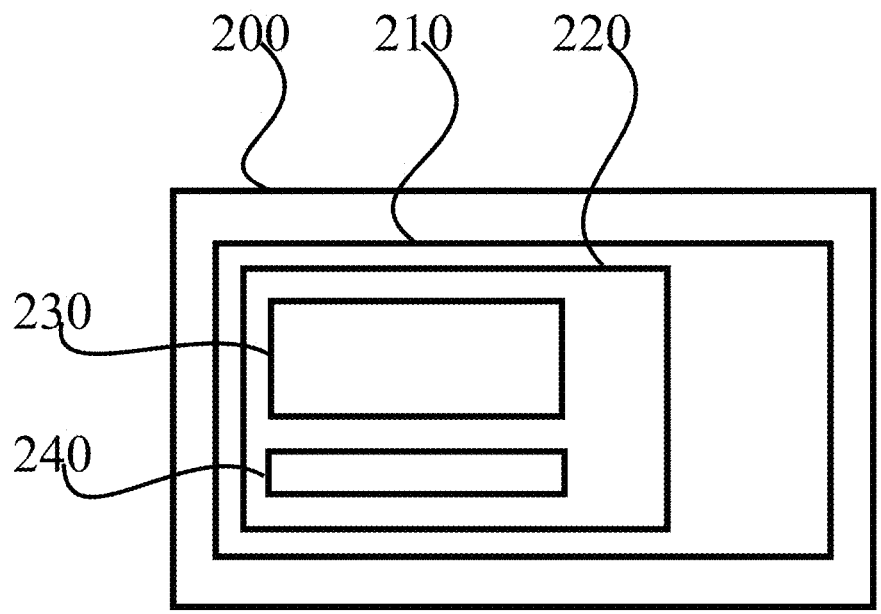
FIG. 2 illustrates an example user interface in accordance with at least some embodiments of the present invention.

FIG. 2 illustrates an example user interface in accordance with at least some embodiments of the present invention. The user interface may be comprised in device 110 of FIG. 1A or FIG. 1B, for example. Display 200 is configured to provide a user interface display to the user. Display area 210 provides a system level display to the user. In system level display 210 is comprised application level display 220, the application enabling, for example, to activity session management. In application level display 220 are comprised predicted user activity type 230 and a secondary predicted user activity type 240. Predicted user activity type 230 may correspond to the activity type determined to be most likely, while secondary predicted user activity type 240 may correspond to the activity type determined to be the most likely activity type the user is about to engage in, or already engaged in, in case predicted user activity type 230 is not the correct one.

The predicted activity type 230 may be presented in a larger font, as illustrated, yielding a good user experience to the user. The secondary type 240 is also visible, increasing the likelihood the user can quickly select the correct activity type and also giving the user a sense of control. Both of these factors increase the usability and thus likelihood the application is used. The likelier the application is used, the likelier the user may be contacted, for example in case of the chemical leak mentioned above necessitates warning people in the area, or role-specific actions need to be taken in a nuclear power station. Thus also personal safety of the user may be increased.

Figure 3:
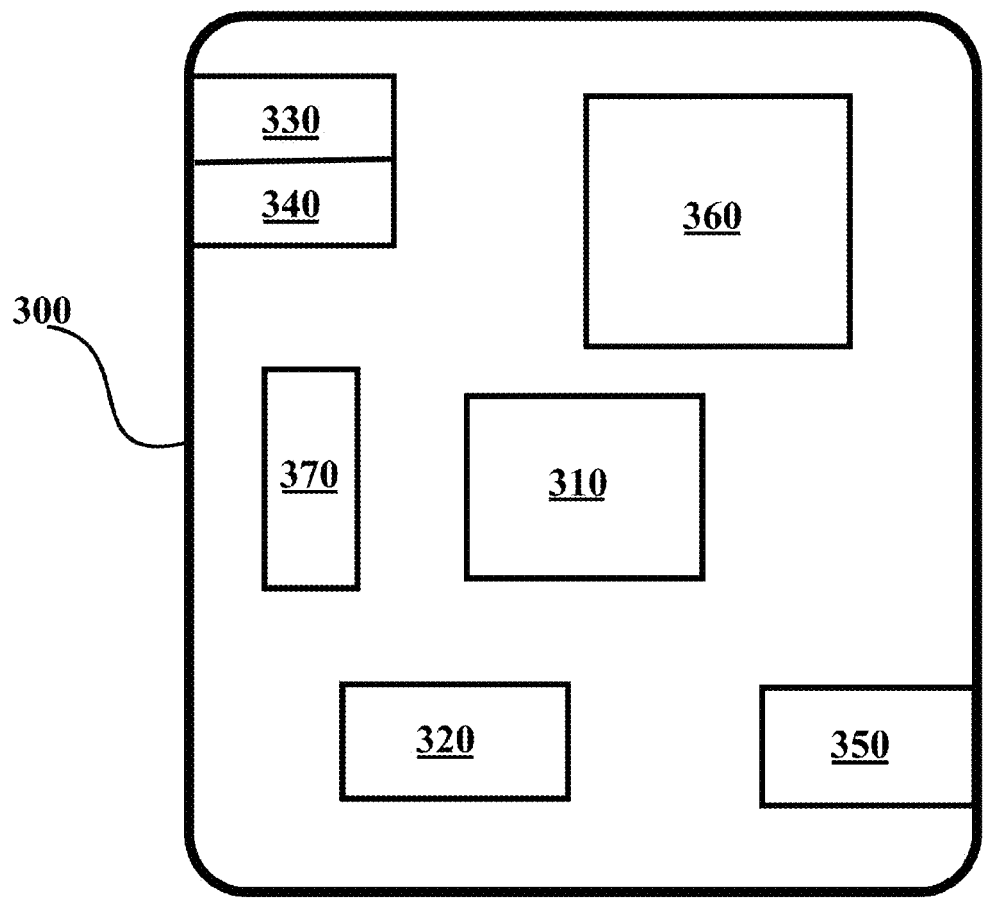
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as device 110 of FIG. 1 or FIG. 1B. Device 330 may alternatively or additionally correspond to auxiliary device 110x of FIG. 1B. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to select an activity type and/or to place voice calls, where applicable, for example.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
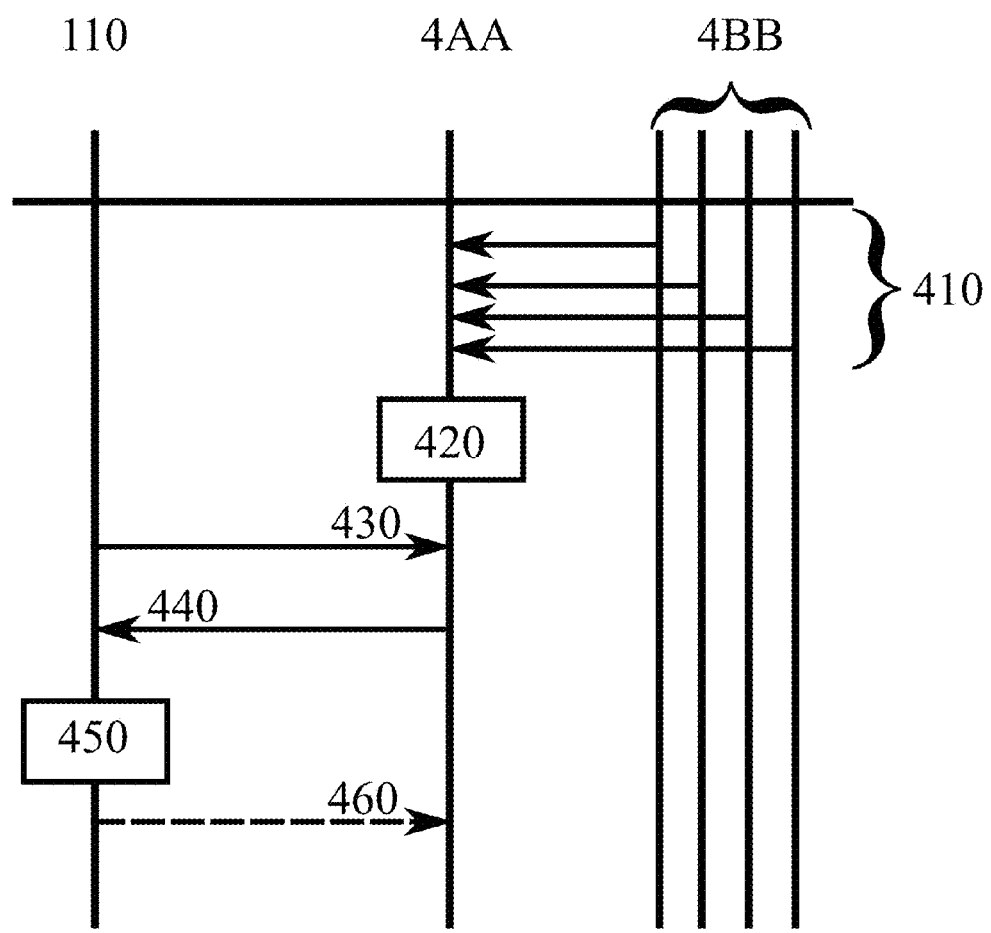
FIG. 4 illustrates signalling in accordance with at least some embodiments of the invention.

FIG. 4 illustrates signalling in accordance with at least some embodiments of the invention. On the vertical axes are disposed, from left to right, device 110 of FIGS. 1A and 1B, server 4AA and further users 4BB. In general further users 4BB comprise a set of users other than the user of device 110, although the user of device 110 may in some cases be comprised in the set of further users 4BB.

In collective phase 410, which may take place over a period of time, the period of time preceding the other phases of the figure possibly by a several months or more, further users 4BB provide to server 4AA indications of their locations and activity types that are selected, implicitly or explicitly, in those locations. For example, these indications may relate to activity types of activity sessions the further users are engaged in, as well as the corresponding locations.

In phase 420, server 4AA may construct or update a thematic map database based on the indications received in phase 410, and/or indications otherwise obtained in server 4AA. The thematic map database may comprise a heat map, for example. The thematic map database associates activity types with locations, enabling determination of statistical probabilities for activity types as a function of location.

In phase 430, device 110 queries the database by transmitting a query to the server, the query comprising an implicit or explicit indication of a location of device 110. Responsively, in phase 440, server 4AA transmits back to device 110 a set of activity types that are associated with the location of device 110, and, optionally, statistical probabilities of at least one, and optionally all, of the activity types in the set.

Phase 450 comprises determining a predicted user activity type, based at least partially on the set of activity types received in phase 440, and presenting the predicted user activity type to the user as a suggested activity type. Determining the predicted user activity type has been described above.

Optional phase 460 comprises transmitting to server 4AA an indication of an activity type the user selects, which may be, but need not be, the suggested activity type. The message of phase 460 may also comprise an indication of the current location of device 110.

Figure 5:
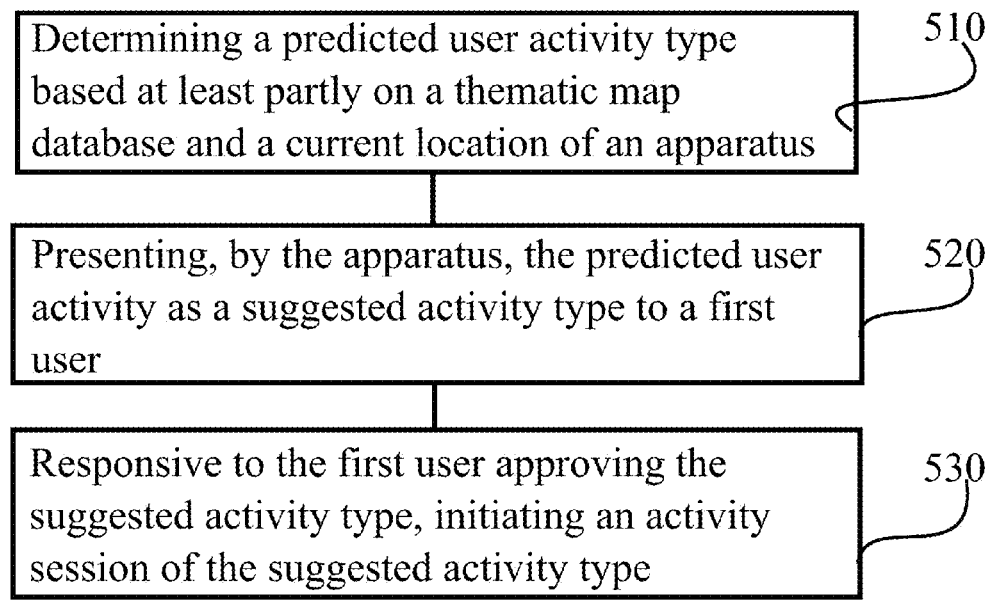
FIG. 5 is a flow graph of a method in accordance with at least some embodiments of the present invention.

FIG. 5 is a flow graph of a method in accordance with at least some embodiments of the present invention. The phases of the illustrated method may be performed in device 110, for example, or in a control device configured to control the functioning of device 110, when implanted therein, for example.

Phase 510 comprises determining a predicted user activity type based at least partly on a thematic map database and a current location of an apparatus. Phase 520 comprises presenting, by the apparatus, the predicted user activity type as a suggested activity type to a first user. Finally, phase 530 comprises, responsive to the first user approving the suggested activity type, initiating an activity session of the suggested activity type It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing device usability and/or personal safety.

REFERENCE SIGNS LIST

| 110 | Device |
| 110x | Auxiliary device |

-continued

| | |
|---|---|
| 120 | Base station |
| 130 | Network node |
| 140 | Network |
| 150 | Satellite constellation |
| 200 | Display |
| 210 | System level display |
| 220 | Application level display |
| 230 | Predicted user activity type |
| 240 | Secondary predicted user activity type |
| 310-370 | Elements of FIG. 3 |
| 410-460 | Phases of the signalling illustrated in FIG. 4 |
| 510-530 | Phases of the method of FIG. 5 |

The invention claimed is:

1. An apparatus comprising at least one processing core, at least one memory including computer program code, the at least one memory and the computer program code being configured to, with the at least one processing core, cause the apparatus at least to:
   determine a predicted user activity type based at least partly on a thematic map database and a current location of the apparatus;
   present the predicted user activity type as a suggested activity type to a first user, and
   responsive to the first user approving the suggested activity type, initiate an activity session of the suggested activity type,
   provide a recording of the activity session, the recording comprising information on at least one of the following: a route taken during the activity session, a metabolic rate or metabolic effect of the activity session, a quantity of energy consumed during the activity session, a sound recording obtained during the activity session and an elevation map along the route taken during the activity session.

2. The apparatus according to claim 1, wherein the thematic map database comprises a heat map.

3. The apparatus according to claim 1, wherein the thematic map database associates past indications of activity type with geographic locations where the past indications of activity type have been made.

4. The apparatus according to claim 3, wherein the past indications of activity type have been made by a plurality of users.

5. The apparatus according to claim 1, wherein the at least one memory and the computer program code are configured to, with the at least one processing core, cause the apparatus to determine the predicted user activity type based at least partly on at least one of the following: a season of the year, a time of day, an output of an acceleration sensor, user settings of the first user and history information of the first user.

6. The apparatus according to claim 5, wherein the acceleration sensor is comprised in the apparatus.

7. The apparatus according to claim 5, wherein the apparatus is configured to receive the output of the acceleration sensor from a personal device of the user.

8. The apparatus according to claim 7, wherein the apparatus is configured to receive the output of the acceleration sensor via a short-range wireless interface arranged between the apparatus and the personal device of the user.

9. The apparatus according to claim 1, wherein the at least one memory and the computer program code are configured to, with the at least one processing core, cause the apparatus to determine the predicted user activity type at least partly by transmitting a query to a thematic map database server, the query comprising an indication of the current location of the apparatus.

10. The apparatus according to claim 1, wherein the at least one memory and the computer program code are configured to, with the at least one processing core, cause the apparatus to modify a display provided to the first user based at least partly on the predicted user activity type prior to the first user approving the suggested activity type.

11. The apparatus according to claim 1, wherein the at least one memory and the computer program code are configured to, with the at least one processing core, cause the apparatus to determine the predicted user activity type based at least partly on presence of sensor information originating in an activity type specific sensor.

12. The method according to claim 1 wherein the apparatus is a smart watch.

13. The method according to claim 1 wherein the apparatus is a smart watch further comprising a display configured to present the predicted user activity type.

14. A method comprising:
   determining a predicted user activity type based at least partly on a thematic map database and a current location of an apparatus;
   presenting, by the apparatus, the predicted user activity type as a suggested activity type to a first user;
   responsive to the first user approving the suggested activity type, initiating an activity session of the suggested activity type, and
   providing a recording of the activity session, the recording comprising information on at least one of the following: a route taken during the activity session, a metabolic rate or metabolic effect of the activity session, a quantity of energy consumed during the activity session, a sound recording obtained during the activity session and an elevation map along the route taken during the activity session.

15. The method according to claim 14, wherein the thematic map database comprises a heat map.

16. The method according to claim 14, wherein the thematic map database associates past indications of activity type with geographic locations where the past indications of activity type have been made.

17. The method according to claim 16, wherein the past indications of activity type have been made by a plurality of users.

18. The method according to claim 14, wherein the predicted user activity type is determined based at least partly on at least one of the following: a season of the year, a time of day, an output of an acceleration sensor, user settings of the first user and history information of the first user.

19. The method according to claim 18, wherein the acceleration sensor is comprised in the apparatus.

20. The method according to claim 18, further comprising receiving, in the apparatus, the output of the acceleration sensor from a personal device of the user.

21. The method according to claim 20, further comprising receiving the output of the acceleration sensor via a short-range wireless interface arranged between the apparatus and the personal device of the user.

22. A non-transitory computer readable medium having stored thereon a set of computer readable instructions that, when executed by at least one processor, cause an apparatus to at least:

determine a predicted user activity type based at least partly on a thematic map database and a current location of the apparatus;
present the predicted user activity type as a suggested activity type to a first user;
responsive to the first user approving the suggested activity type, initiate an activity session of the suggested activity type, and
provide a recording of the activity session, the recording comprising information on at least one of the following: a route taken during the activity session, a metabolic rate or metabolic effect of the activity session, a quantity of energy consumed during the activity session, a sound recording obtained during the activity session and an elevation map along the route taken during the activity session.

* * * * *

UNITED STATES PATENT AND TRADEMARK OFFICE
CERTIFICATE OF CORRECTION

PATENT NO. : 10,373,059 B2
APPLICATION NO. : 15/365970
DATED : August 6, 2019
INVENTOR(S) : Lindman et al.

Page 1 of 1

It is certified that error appears in the above-identified patent and that said Letters Patent is hereby corrected as shown below:

On the Title Page

Item (54) and Column 1, Line 1, "MAG" should read --MAP--

Signed and Sealed this
Tenth Day of September, 2019

Andrei Iancu
*Director of the United States Patent and Trademark Office*